(12) United States Patent
Montemurro et al.

(10) Patent No.: US 8,619,735 B2
(45) Date of Patent: Dec. 31, 2013

(54) METHODS AND APPARATUS TO REGISTER WITH EXTERNAL NETWORKS IN WIRELESS NETWORK ENVIRONMENTS

(75) Inventors: Michael Montemurro, Toronto (CA); Stephen McCann, Rownhams (GB)

(73) Assignee: BlackBerry Limited, Waterloo, Ontario (CA)

( * ) Notice: Subject to any disclaimer, the term of this patent is extended or adjusted under 35 U.S.C. 154(b) by 296 days.

(21) Appl. No.: 12/836,270

(22) Filed: Jul. 14, 2010

(65) Prior Publication Data

US 2011/0164596 A1   Jul. 7, 2011

Related U.S. Application Data

(60) Provisional application No. 61/226,208, filed on Jul. 16, 2009.

(51) Int. Cl.
*H04W 4/00*   (2009.01)
(52) U.S. Cl.
USPC ............................. 370/338; 370/464; 455/450
(58) Field of Classification Search
USPC ......... 370/328, 329, 339, 400, 431, 464, 465, 370/468, 469; 455/450–453
See application file for complete search history.

(56) References Cited

U.S. PATENT DOCUMENTS

| 7,433,688 | B2 * | 10/2008 | Miernik et al. ............ 455/432.3 |
|---|---|---|---|
| 2001/0012787 | A1 * | 8/2001 | Wortham ...................... 455/552 |
| 2002/0002049 | A1 * | 1/2002 | Nicolas ......................... 455/433 |
| 2002/0081995 | A1 | 6/2002 | Leppinen et al. |
| 2002/0198849 | A1 | 12/2002 | Piikivi |
| 2005/0021959 | A1 | 1/2005 | Tsushima et al. |
| 2006/0233198 | A1 | 10/2006 | Kim et al. |
| 2006/0268802 | A1 | 11/2006 | Faccin |
| 2007/0047491 | A1 | 3/2007 | Dutta et al. |
| 2007/0189218 | A1 | 8/2007 | Oba et al. |
| 2007/0204155 | A1 | 8/2007 | Dutta et al. |
| 2008/0069065 | A1 | 3/2008 | Wu et al. |
| 2008/0070544 | A1 | 3/2008 | Lior |
| 2008/0151796 | A1 | 6/2008 | Jokela |
| 2008/0276303 | A1 | 11/2008 | Gast |
| 2008/0298333 | A1 | 12/2008 | Seok |

(Continued)

FOREIGN PATENT DOCUMENTS

| JP | 2006-517359 | 7/2006 |
|---|---|---|
| WO | 2004/064306 | 7/2004 |

(Continued)

OTHER PUBLICATIONS

RFC 3023 "XMl media Type" Jan. 2001.*

(Continued)

*Primary Examiner* — Kerri Rose
(74) *Attorney, Agent, or Firm* — Hanley, Flight and Zimmerman, LLC

(57) ABSTRACT

Example methods and apparatus to register with external networks in wireless network environments are disclosed. A disclosed example method involves sending a registration request from the device to a network entity and receiving a registration response at the device. The registration response indicates one or more registration plans. The example method also involves selecting a registration plan from the one or more registration plans and sending registration information associated with the device to the network entity. The registration information is selected based on the selected registration plan.

20 Claims, 9 Drawing Sheets

(56) References Cited

U.S. PATENT DOCUMENTS

| | | |
|---|---|---|
| 2008/0310366 A1 | 12/2008 | Oba et al. |
| 2009/0010399 A1 | 1/2009 | Kim et al. |
| 2009/0022076 A1 | 1/2009 | Canpolat et al. |
| 2009/0046657 A1 | 2/2009 | Kim et al. |
| 2009/0158148 A1* | 6/2009 | Vellanki et al. ............... 715/700 |
| 2009/0225731 A1 | 9/2009 | Kneckt et al. |
| 2009/0232042 A1 | 9/2009 | Kneckt et al. |
| 2009/0245133 A1 | 10/2009 | Gupta et al. |
| 2009/0268652 A1 | 10/2009 | Kneckt et al. |
| 2009/0274094 A1 | 11/2009 | Engwer |
| 2009/0279449 A1 | 11/2009 | Kneckt et al. |
| 2010/0008337 A1 | 1/2010 | Bajko |
| 2010/0146272 A1 | 6/2010 | Centonza et al. |
| 2010/0198952 A1 | 8/2010 | Kneckt et al. |
| 2010/0275249 A1 | 10/2010 | McCann et al. |
| 2012/0017267 A1 | 1/2012 | McCann et al. |

FOREIGN PATENT DOCUMENTS

| | | |
|---|---|---|
| WO | 2004/064306 A2 | 7/2004 |
| WO | 2005/094011 A2 | 10/2005 |
| WO | 2009/027853 A1 | 3/2009 |

OTHER PUBLICATIONS

Hilt et al., "A Framework for Session Initiation Protocol (SIP) Session Policies," SIPPING Working Group, Internet-Draft, Nov. 1, 2008, [retrieved from http://tools.ietf.org/html/draft-ietf-sip-session-policy-framework-05 on Dec. 27, 2010], 36 pages.
"Extensible Authentication Protocol," From Wikipedia, the free encyclopedia, [retrieved from http://en.wikipedia.org/wiki/Extensible_Authenitcation_Protocol on Dec. 27, 2010], Dec. 8, 2010, 8 pages.
"Extensible Authentication Protocol," From Wikipedia, the free encyclopedia, [retrieved from http://en.wikipedia.org/w/index.php?title=Extensible_Authentication_Protocol&oldid=297168642 on Dec. 27, 2010], Jun. 18, 2009, 7 pages.
Petrie et al., "A Framework for Session Initiation Protocol User Agent Profile Delivery," SIPPING, Internet-Draft, Feb. 13, 2008, [retrieved from http://tools.ietf.org/html/draft-ietf-sipping-config-framweork-15 on Dec. 27, 2010], 56 pages.
Hilt et al., "A User Agent Profile Data Set for Media Policy," SIPPING Working Group, Internet-Draft, Jul. 12, 2008, [retrieved from http://tools.ietf.org/html/draft-ietf-sipping-media-policy-dataset-06 on Dec. 27, 2010], 36 pages.
Hilt et al., "A Framework for Session Initiation Protocol (SIP) Session Policies," SIPPING Working Group, Internet-Draft, Apr. 27, 2008, [retrieved from http://tools.ietf.org/html/draft-ietf-sip-session-policy-framework-03 on Dec. 27, 2010], 36 pages.
Hilt et al., "A Session Initiation Protocol (SIP) Event Package for Session-Specific Session Policies," SIPPING Working Group, Internet-Draft, Jul. 12, 2008, [retrieved from http://tools.ieft.org/id/draft-ietf-sipping-policy-package-05],37 pages.
Hilt et al., "A Session Initiation Protocol (SIP) Event Package for Session-Specific Session Policies," SIPPING Working Group, Internet-Draft, Jan. 28, 2007, [retrieved from http://tools.ieft.org/html/draft-ietf-sipping-policy-package-03 on Dec. 27, 2010],18 pages.
802.11 Working Group of the 802 Committee, "Draft Standard for Information Technology-Telecommunications and information exchange between systems—Local and metropolitan area networks—Specific Requirements," IEEE P802.11u/D7.0, published Jun. 2009, IEEE Standards, New York, NY, USA, 197 pages.
Rigney et al., "Remote Authentication Dial in User Service (RADIUS)," Network Working Group, Request for Comments: 2865, Jun. 2000, 77 pages.
Calhoun et al., "Diameter Base Protocol," Network Working Group, Request for Comments: 3588, Sep. 2003, 147 pages.
Kawatsura, Y., "Secure Electronic Transaction (SET) Supplement for the v1.0 Internet Open Trading Protocol (IOTP)," Network Working Group, Request for Comments: 3538, Jun. 2003, 57 pages.
Cam-Winget et al., "Dynamic Provisioning Using Flexible Authentication via Secure Tunneling Extensible Authentication Protocol (EAP-FAST)," Network Working Group, Request for Comments: 5422, Mar. 2009, 40 pages.
Roach, A.B., "Session Initiation Protocol (SIP)—Specific Event Notification," Network Working Group, Request for Comments: 3265, Jun. 2002, 38 pages.
Aboba et al., "The Network Access Identifier," Network Working Group, Request for Comments: 4282, Dec. 2005, 17 pages.
Schulzrinne, H., "CIPID: Contact Information for the Presence Information Data Format," Network Working Group, Request for Comments: 4482, Jul. 2006, 12 pages.
Aboba et al., "Extensible Authentication Protocol (EAP) Key Management Framework," Network Working Group, Request for Comments: 5247, Aug. 2008, 80 pages.
Rosenberg et al., "SIP: Session Initiation Protocol," Network Working Group, Request for Comments: 3261, Jun. 2002, 270 pages.
Blunk et al., "PPP Extensible Authentication Protocol (EAP)," Network Working Group, Request for Comments: 2284, Mar. 1998, 16 pages.
Townsley et al., "Layer Two Tunneling Protocol 'L2TP'," Network Working Group, Request for Comments: 2661, Aug. 1999, 81 pages.
Stanley et al., "Extensible Authentication Protocol (EAP) Method Requirements for Wireless LANs," Network Working Group, Request for Comments: 4017, Mar. 2005, 12 pages.
Kempf et al., "Distributing a Symmetric Fast Mobile Ipv6 (FMIPv6) Handover Key Using Secure Neighbor Discovery (SEND)," Network Working Group, Request for Comments: 5269, Jun. 2008, 15 pages.
Kempf et al., "Distributing a Symmetric Fast Mobile IPv6 (FMIPv6) Handover Key using Secure Neighbor Discovery (SEND)," Network Working Group, Request for Comments: 5108, Jan. 2008, 15 pages.
Patent Cooperation Treaty, "Written Opinion of the International Searching Authority," issued by the International Searching Authority in connection with PCT/IB2010/053248, mailed Dec. 22, 2010 (7 pages).
Patent Cooperation Treaty, "International Search Report," issued by the International Searching Authority in connection with PCT application No. PCT/IB2010/053248, mailed Dec. 22, 2010 (4 pages).
Patent Cooperation Treaty, "International Preliminary Report on Patentability," issued by the International Preliminary Examining Authority in connection with PCT application No. PCT/IB2010/053248, mailed Oct. 10, 2011 (7 pages).
Haverinen et al., "Extensible Authentication Protocol Method for Global System for Mobile Communications (GSM) Subscriber Identity Modules (EAP-SIM); rfc4186.txt", IETF Standard, Internet Engineering Task Force, IETF, CH, Jan. 2006, 92 pages.
Lloyd et al., "PPP Authentication Protocols," Network Working Group, Request for Comments (RFC) 1334, Oct. 1992, 16 pages.
Simpson, W., "PPP Challenge Handshake Authentication Protocol (CHAP)," Network Working Group, Request for Comments (RFC) 1994, Aug. 1996, 13 pages.
Zorn et al., "Microsoft PPP CHAP Extensions," Network Working Group, Request for Comments (RFC) 2433, Oct. 1998, 20 pages.
Zorn, G., "Microsoft PPP CHAP Extensions, Version 2," Network Working Group, Request for Comments (RFC) 2759, Jan. 2000, 20 pages.
Aboba et al., "Extensible Authentication Protocol (EAP)," Network Working Group, Request for Comments (RFC) 3748, Jun. 2004, 67 pages.
Berners-Lee et al., "Uniform Resource Identifier (URI): Generic Syntax," Network Working Group, Request for Comments (RFC) 3986, Jan. 2005, 61 pages.
International Standard ISO/IEC 8802.11, "Information technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (MAC) Security Enhancements," ISO/IEC 8802-11:2005/Amd.6:2006(E), IEEE STD 802.11i-2004 (Amendment to IEEE Std 802.11-1999), Dec. 15, 2006, 197 pages.
Arkko et al, "Network Discovery and Selection Problem," rfc5113, IETF Standard, Internet Engineering Task Force, IETF, Jan. 1, 2008, XP015055182, ISSN: 0000-0003, pp. 1-39.

(56) References Cited

OTHER PUBLICATIONS

Canpolat et al, "IEEE 802.11u Network Selection & MIH Support," Sep. 19, 2006, pp. 1-19, XP002478803 [Retrieved from: URL: https://mentor.ieee.org/802.11/dcn/06/11-06-1069-00-000u-tgu-overview.ppt].

802.11 Working Group of the 802 Committee, "Draft Standard for Information Technology-Telecommunications and information exchange between systems—Local and metropolitan area networks—Specific Requirements," IEEE P802.11u/D6.0, published Apr. 9, 2009, IEEE Standards, New York, NY, USA, 208 pages.

Korean Intellectual Property Office, "Office Action," issued in connection with Korean application No. 10-2011-7031631, on Feb. 4, 2013 (10 pages).

European Patent Office, "Exam Report," issued in connection with European application No. 10 745 000.9, on Mar. 19, 2013 (7 pages).

Korean Intellectual Property Office, "Notice of Allowance," issued in connection with Korean Patent Application No. 10-2011-7031631, on Jul. 24, 2013, 3 pages.

Japanese Patent Office, "Notice of Reasons for Rejection," issued in connection with Japanese Patent Application No. 2012-520147, on Apr. 1, 2013, 10 pages.

IP Australia, "Patent Examination Report No. 1," issued in connection with Australian Patent Application No. 2010272153, on May 23, 2013, 3 pages.

\* cited by examiner

COMMUNICATION LAYER ARCHITECTURE

| REGISTRATION PARAMETERS 304 | | |
|---|---|---|
| 308a | PLAN TYPE | FREE |
| | | TIME-BASED |
| | | PAY-AS-YOU-GO |
| 308b | | UNLIMITED |
| | TERMS AND CONDITIONS | USER-ACKNOWLEDGE REQUIRED: YES/NO |
| | | TERMS AND CONDITIONS TEXT |
| 308c | SIGN UP | FIRST NAME, LAST NAME, INITIALS |
| | | USERNAME/PASSWORD |
| | | EMAIL |
| | | PHONE NO(S). (HOME, WORK, MOBILE, FAX) |
| | | RESIDENCE ADDRESS |
| | | CREDIT CARD INFORMATION |
| | | PAYMENT TOKEN NUMBER |
| | | HOTEL ROOM |
| | | ACCESS CODE (E.G., GUEST ACCESS) |
| 310 | | ACCESS TIME LIMIT |
| 308d | REGISTRATION RESULT | REGISTRATION STATUS |
| | | LIST OF INVALID FIELDS |
| | PAYMENT | REQUIRED: YES/NO |
| 308e | PROVISIONING | REQUIRED: YES/NO |

FIG. 4

ACCESS POINT

METHODS AND APPARATUS TO REGISTER WITH EXTERNAL NETWORKS IN WIRELESS NETWORK ENVIRONMENTS

RELATED APPLICATIONS

This patent claims the benefit of U.S. Provisional Patent Application No. 61/226,208, filed on Jul. 16, 2009, which is hereby incorporated herein by reference in its entirety.

FIELD OF THE DISCLOSURE

The present disclosure relates generally to network communications and, more particularly, to methods and apparatus to register with external networks in wireless network environments.

BACKGROUND

Wireless network deployments, such as wireless local area networks (WLANs), allow wireless terminals to access network and Internet services when within proximity of wireless communication signals of those wireless networks. Commercially available WLANs, such as those located in retail environments or other publically accessible establishments, operate in unsecure modes to enable wireless terminals to establish communications with the WLANs and external networks (e.g., service provider networks, carrier networks, etc.) accessible via those WLANs. This unsecure mode of operation allows wireless terminals to negotiate connection and registration information with the external networks via high-level communications using Internet protocol (IP) addresses and a hypertext transfer protocol (HTTP) to enable registration of the wireless terminals with the external networks. However, such unsecure modes of operation using high-level communications leaves external networks vulnerable to malicious attacks or other undesirable activity aimed at circumventing network procedures created for orderly and deterministic wireless terminal registration.

BRIEF DESCRIPTION OF THE DRAWINGS

FIG. 4 depicts an example registration parameters data structure showing a plurality of example registration parameters selectable by service providers to enable wireless terminals to register with their external networks.

DETAILED DESCRIPTION

Figure 1:
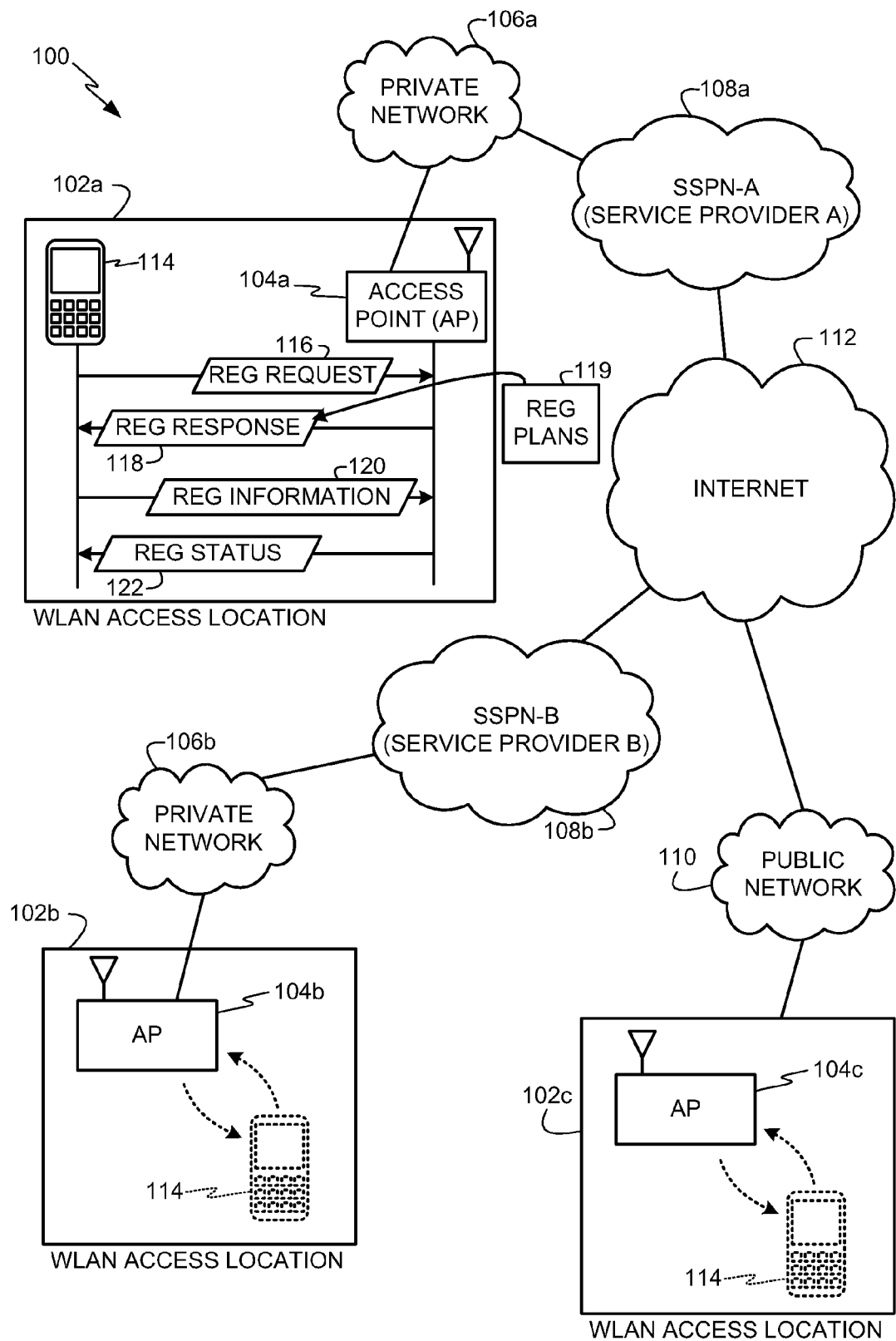
FIG. 1 depicts an example communication network in which a plurality of wireless local area network access locations are communicatively coupled to one or more external networks.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used by wireless terminals to register with external networks via wireless network environments. The example methods and apparatus described herein can be used in connection with mobile communication devices, mobile computing devices, or any other device capable of communicating wirelessly with a wireless network. Such devices, also referred to as terminals, wireless terminals, or user equipment (UE), may include mobile smart phones (e.g., a BlackBerry® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including other WLAN standards, personal area network (PAN) standards, wide area network (WAN) standards, or cellular communication standards.

Although the example methods and apparatus described herein can be implemented in any environment providing WLAN access for network connectivity, the example methods and apparatus can be advantageously implemented in WLAN access locations or environments in which it is expected that one or more users carrying respective wireless terminals will frequently connect and disconnect from a WLAN as they enter and exit the WLAN access locations or environments. WLAN locations or environments are sometimes known as "hotspots" in reference to a location or environment that is within communication reach of WLAN signals. Such example WLAN locations or environments include coffee shops, retail stores, educational facilities, office environments, airports, public transportation stations and vehicles, hotels, etc. Such WLANs are often associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In this manner, a subscriber/user subscribed to such a service can access wireless network access and/or Internet-access services based on such a subscription when the subscriber is in communication proximity of the WLAN with an appropriate wireless terminal. In some instances, owners/operators of external networks allow temporary external network access without a subscription in return for a pay-as-you-go or pay-per-use payment.

The user experience associated with known techniques or standards for registering a wireless terminal to an external network via an access point (AP) of a WLAN hotspot can often be frustrating. For example, it is often necessary to correctly discover the radio network identifier (e.g., an IEEE® 802.11 Service Set Identifier (SSID) parameter), and it may also be necessary to provide registration information such as login credentials, wireless terminal information, personal information (e.g., name and postal address), payment information (e.g., credit card number, account number, prepaid account number, coupon number, etc.), terms and conditions acceptance, etc. Such registration information can be chosen by a hotspot owner/provider as information required to connect to the external network behind the AP of the hotspot.

In some instances, a wireless terminal may locally pre-store required registration information to enable automatically registering the wireless terminal with an external network upon detection of a WLAN hotspot supporting the external network. In this manner, the example methods and apparatus described herein can be advantageously used in connection with wireless terminals that do not provide displays or user-input interfaces to allow users to enter the registration information. For example, an 802.11-based, wireless Ethernet portable music player may provide a user interface to enable selecting streaming music stations, but the user interface may not be sufficiently sophisticated to enable other types of user-entered information (e.g., entry of registration information). However, the methods and apparatus described herein can enable such a portable music player to register with an external network via a WLAN hotspot when the portable music player has pre-stored therein all of the registration information required by that external network for registration.

In other instances, the example methods and apparatus described herein can be used in connection with wireless terminals that pre-store only a portion of required registration information or no registration information at all. For such example implementations, a user can be prompted to provide some or all of the required registration information via a user interface of the wireless terminal.

Traditional techniques for registering wireless terminals to external networks typically involve assigning IP addresses to the wireless terminals before the wireless terminals are registered or authenticated. The assigned IP addresses enable invocation of HTTP-based web pages on the wireless terminals to request users to manually enter registration credentials (e.g., username/password, payment information, personal user information, etc.) required to register the wireless terminals to the external networks. Typically, such traditional IP address-based registration techniques are carried over secured browser connections using HTTPS (i.e., HTTP protocol over a secure sockets layer (SSL) protocol). To enable provisioning of IP addresses before registering or authenticating the wireless terminals, WLAN APs must operate in an open unsecure mode in which information may be exchanged via IP-based communications without user or device authentication. As WLAN technology is further deployed throughout different locations, open and unsecure access will appeal to fewer and fewer WLAN hotspot providers. For instance, such open unsecure access can often create certain vulnerabilities to WLAN-supported external networks that can be exploited in harmful ways by malicious or mischievous users. That is, users can spoof hotspots or network resources using authentication-bypass techniques based on IP or HTTP communications or other communication protocols accessible based on assigned IP addresses. Thus, completely unsecure access may be found undesirable enough that its use may decrease over time until it is no longer used.

Unlike traditional network registration techniques, the example methods and apparatus described herein can be used to register wireless terminals with external networks in a more secure and reliable manner than the unsecure access by substantially reducing or eliminating security vulnerabilities based on unsecure IP communications. In addition, the example methods and apparatus can substantially reduce or eliminate reliance on user involvement to register wireless terminals with external networks, thereby improving user experiences with wireless network services that may be provided by hotspots. Example scenarios in which the example methods and apparatus can be advantageously used are described below in connection with FIG. 1.

Turning now to FIG. 1, an example communication network 100 in which the example methods and apparatus described herein may be implemented is shown. As shown in FIG. 1, the example communication network 100 includes a plurality of WLAN access locations 102a-c that provide access to one or more networks (e.g., WLAN-supported networks or external networks) via respective access points 104a-c. In the illustrated example, the access point (AP) 104a provides access to a private network 106a, which in turn provides access to a subscription service provider network A (SSPN-A) 108a. Also, in the illustrated example, the AP 104b provides access to a private network 106b, which in turn provides access to a subscription service provider network B (SSPN-B) 108b. The SSPNs 108a-b may be owned and/or operated by data subscription service providers, Internet subscription service providers, media (e.g., audio/video) subscription service providers, wireless communications subscription service providers, or any combination thereof.

The AP 104c provides access to a public network 110, which is shown as providing access to the Internet 112. Although not shown, each of the APs 104a-c is provided with an AP station (i.e., an AP STA), which is the interface or component, such as a network adapter or network interface card (NIC), that connects to a wireless medium. In the illustrated examples described herein, each of the APs 104a-c includes a respective AP STA, while a wireless terminal 114 that communicates with the APs 104a-c includes a non-AP station (i.e., a non-AP STA).

Figure 3:
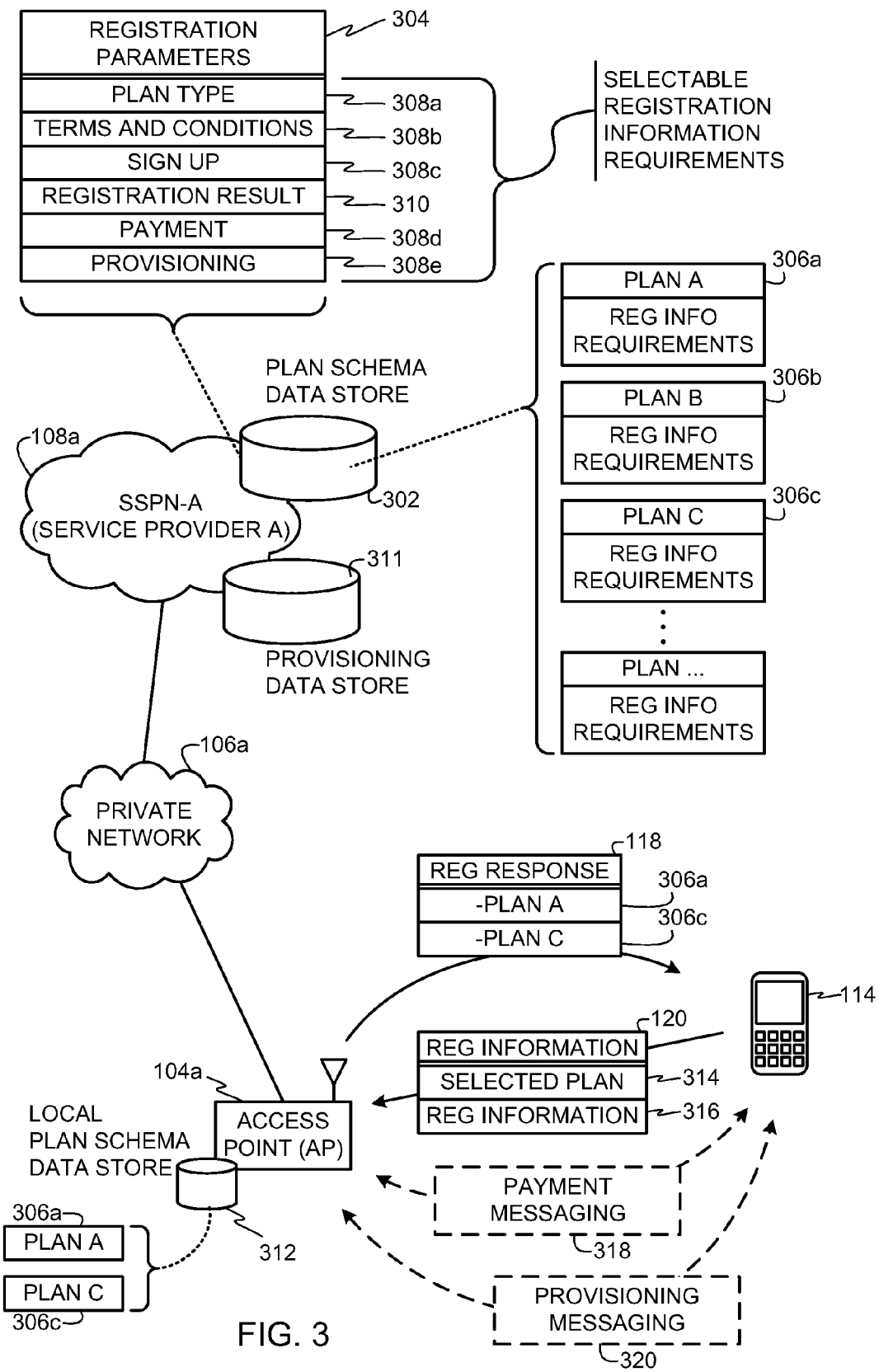
FIG. 3 depicts an example registration plan selection process implemented using an external network and wireless terminal of FIG. 1.

Each of the WLAN access locations 102a-c may be associated with different registration plans (shown in FIG. 3). As explained in connection with FIG. 3, each registration plan includes a set of registration parameters indicative of registration information required of a wireless terminal 114 to register with the networks 106a, 106b, and/or 110 through the APs 104a-c based on that registration plan. The registration plans and their corresponding sets of registration parameters can be selected by respective owners or operators of the networks 106a, 106b, and 110 based on different factors such as, for example, subscription usage plans, desired security levels, business objectives, etc. For instance, if service provider A only allows subscribers of its services to access the SSPN-A 108a, the private network 106a may require selection of a registration plan requiring registration information that can be used to confirm a user's network service subscription with the service provider A. Such registration information may include a user name, residence address, email address, telephone number, etc. Accordingly, to connect with the AP 104a, a wireless terminal 114 must meet the criteria specified by service provider A, otherwise connection with the AP 104*a* is not allowed. The private network 106*b* may have a different type of contract agreement with service provider B, which operates the SSPN 108*b*, to allow temporary or guest registrations. In such an instance, the private network 106*b* may allow selections of registration plans that allow the wireless terminal 114 to temporarily connect to the AP 104*b* and register with the private network 106*b* and the SSPN-B 108*b* (e.g., based on a free (no fee) access plan, a pay-as-you-go access plan, a complimentary access plan incidental to other purchase, etc.). In any case, such differing registration plans may be related to different network access charging/pricing structures or different wireless device roaming agreements. Some networks, such as the public network 110, may allow registration of wireless terminals based on less or no registration information.

The example methods and apparatus described herein can also advantageously be used to enable the wireless terminal 114 to move between different WLAN access locations (e.g., the WLAN access locations 102*a-c*) without requiring the wireless terminal 114 to have any pre-knowledge or be pre-configured or pre-loaded with different sets or lists of registration requirements associated with registering with different external networks via respective WLAN access locations. In this manner, the wireless terminal 114 can dynamically receive or learn different registration plans and associated required registration information from any AP that it has not encountered before or for which required registration parameters have changed since a previous access session between the wireless terminal 114 and the AP.

As shown generally in connection with the WLAN access location 102*a*, the wireless terminal 114 can communicate a registration request message 116 to the AP 104*a* and receive a registration response message 118 including one or more selectable registration plans 119 (e.g., registration plans A-C 306*a-c* discussed below in connection with FIG. 3), each including a respective set of registration parameters indicating registration information required by the private network 106*a* and/or the SSPN-A 108*a* to allow the wireless terminal 114 to register therewith. The wireless terminal 114 then communicates a registration information message 120 to the AP 104*a* including a selected (e.g., user-selected or terminal-selected) registration plan and the registration information indicated as required by the selected registration plan. After the AP 104*a* verifies with the private network 106*a* and/or the SSPN-A 108*a* that the registration information provided via the registration information message 120 allows or does not allow network registration of the wireless terminal 114, the AP 104*a* communicates a registration status message 122 to the wireless terminal 114. The registration status message 122 indicates to the wireless terminal 114 whether network registration was successful or failed. In addition, if the network registration failed, the registration status message 122 can also include a listing of the invalid registration information that caused the network registration failure. In this manner, the wireless terminal 114 can provide different information for the registration information indicated as invalid.

In the illustrated example of FIG. 1, the wireless terminal 114 may exchange the messages 116, 118, 120, and 122 while operating in at least one of a registration state (e.g., while the wireless terminal 104 is registering with the AP 104*a*), a discovery state (e.g., while the wireless terminal 104 is in the process of discovering the capabilities of the AP 104*a*), a provisioning state (e.g., while the wireless terminal 104 is in the process of being provisioned with an external network), or an access state (e.g., after the wireless terminal 104 has gained network access via an AP and is subsequently electing to register with an external network in connected to the AP).

In the illustrated example, the messages 116, 118, 120, and 122 can be exchanged prior to, during, or after an authentication process to authenticate the wireless terminal 114 for connection with the AP 104*a*. Example methods and apparatus that may be used to implement an authentication process in connection with the example methods and apparatus described herein are described in U.S. provisional application Ser. No. 12/504,500, filed Jul. 16, 2009, titled "Methods and Apparatus to Discover Authentication Information in a Wireless Networking Environment," which is hereby incorporated herein by reference in its entirety. In addition, the messages 116, 118, 120, and 122 can be exchanged via an extensible authentication protocol (EAP) method (e.g., EAP over IEEE 802.1X). EAP methods are implemented using a universal authentication framework that can be used in wireless networks and point-to-point connections. In particular, the messages 116, 118, 120, and 122 can be communicated via an inner EAP method. Such an inner EAP method is EAP-WISP (wireless internet service provider), which can be used to extend EAP to provide additional functions for hotspot access. This technique uses a tunneled EAP method (e.g., EAP-FAST, PEAP, EAP-TTLS) to provide network registration via hotspots. In this manner, registration information can be provided by wireless terminals (e.g., the wireless terminal 114 of FIG. 1) via lower level communication layers (e.g., the data link layer 202 of FIG. 2) rather than higher level communication layers (e.g., the application layer 210 of FIG. 2) used in traditional techniques to retrieve registration information from wireless terminals after first assigning IP addresses.

Figure 2:
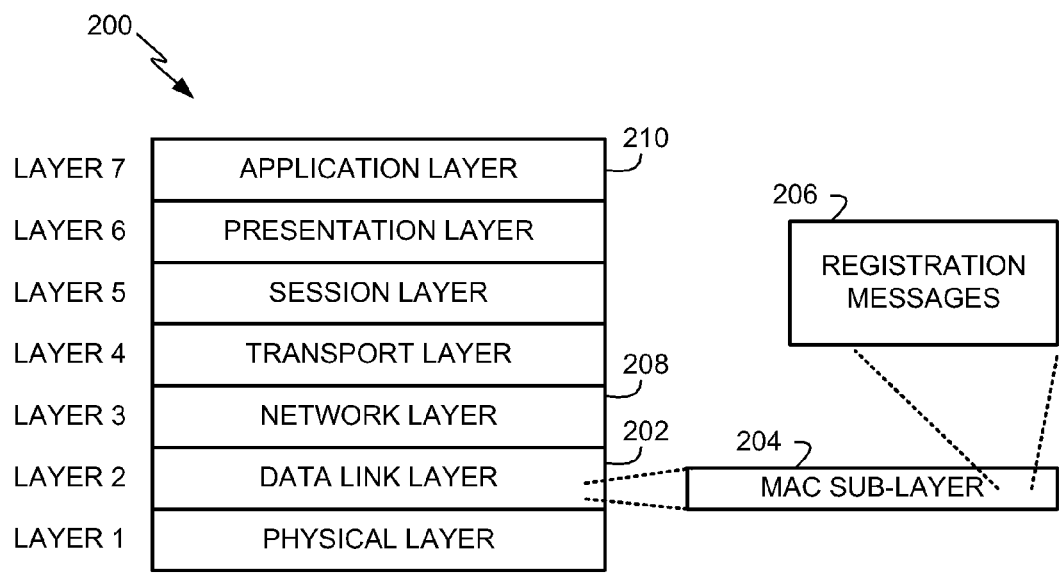
FIG. 2 depicts an example communication layer architecture.

Turning to FIG. 2, an example communication layer architecture 200 is shown as having seven layers which may, for example, be implemented in accordance with the well-known Open Systems Interconnection (OSI) Reference Model. The wireless terminal 114 of FIG. 1 can communicate with the APs 104*a-c* of FIG. 1 based on the example communication layer architecture 200. In the illustrated example, the communication layer architecture 200 includes a data link layer 202, which includes a media access control (MAC) sub-layer 204. To enable wireless terminals (e.g., the wireless terminal 114 of FIG. 1) to exchange network registration messages 206 (e.g., the messages 116, 118, 120, and 122 of FIG. 1) with wireless APs (e.g., the wireless APs 102*a-c* of FIG. 1), the example methods and apparatus described herein can be used to perform operations or processes including providing registration information (e.g., the registration information 120) at the MAC sub-layer 204. That is, a wireless terminal can request to register with a wireless AP and communicate registration information with the wireless AP at the MAC sub-layer 204 without needing to use operations at or above an IP layer (e.g., a network layer 208) nor needing to otherwise provide access to the IP layer during such a registration process.

Some registration techniques that use HTTP or other IP processes to communicate login websites and/or terms and conditions websites require establishing a connection between a wireless terminal (e.g., the wireless terminal 114 of FIG. 1) and a wireless AP (e.g., the AP 104*a*) at one or more of the layers between and including a network layer 208 (e.g., an IP layer) and an application layer 210 of the communication layer architecture 200. However, such techniques can often create certain vulnerabilities to WLAN-supported networks or external networks (e.g., one of the private networks 106*a-b*) that can be exploited in harmful ways by malicious or mischievous users. That is, users can access network resources using authentication-bypass techniques based on IP or HTTP communications or other communication protocols at or above the network layer 208. The example methods and apparatus described herein can be used to exchange the registration messages 206 (e.g., the messages 116, 118, 120, and 122 of FIG. 1) and register wireless terminals with wireless APs using a MAC sub-layer network connection making it relatively more difficult or impossible for users to bypass authentication processes.

In addition, authentication techniques implemented at or above the network layer 208 require relatively more processing power of a wireless terminal than implementing processes at the MAC sub-layer 204. Mobile wireless terminals (e.g., the wireless terminal 114 of FIG. 1) such as mobile smart phones, PDA's, etc. often have relatively limited processor cycles and less available electrical power than fixed-location computing devices powered using alternating current (AC) electricity sources. The example methods and apparatus described herein can be advantageously used to configure, design, or otherwise engineer mobile wireless terminals to operate more efficiently (i.e., do more with fewer processor cycles) and, thus, minimize battery power use. That is, the example methods and apparatus described herein can be advantageously used to promote mobile wireless terminal designs that consume relatively less power and operate relatively more efficiently. For example, low-level resource operations at the MAC sub-layer 204 require relatively fewer system resources than user-interface-intensive and operating system (OS)-intensive operations (e.g., web-browser operations) at the application layer 210.

Another example advantage of registering wireless terminals with wireless APs using the MAC sub-layer 204 is that a registration process can, without user involvement or with minimal user involvement, determine whether connecting to a particular AP is even an option based on the required registration information advertised by that AP and which may be requested by the external network behind the AP. For example, if the AP 104a advertises registration parameters indicating that it requires a valid email address of a subscriber, and the wireless terminal 114 does not have a valid email address pre-stored therein, the wireless terminal 114 can be configured to forego registering and ignore the presence of the AP 104a because the wireless terminal 114 includes pre-stored information that is not sufficient to satisfy the registration requirements advertised by the AP 104a. Thus, the wireless terminal 114 can be configured to not inform its user of the SSID of the AP 104a during a WLAN discovery process initiated by the wireless terminal 114 when it would not be possible for the wireless terminal 114 to connect to the AP 104a without required registration information. Such an implementation substantially reduces or eliminates user frustration because the user would not engage in any attempts to connect when such a connection is impossible based on credentials available to the wireless terminal 114 for registering.

Although an SSID is used in connection with the above example and in other examples described below, an AP may alternatively be configured to broadcast a Homogeneous Extended Service Set Identifier (HESSID). An HESSID includes an SSID associated with a particular AP and a network identification corresponding to a supported SSPN. For instance, if the AP 104a of FIG. 1 were configured to broadcast an HESSID, it would include the SSID of the AP 104a and the network identification corresponding to the SSPN-A 108a.

Other example advantages of the example methods and apparatus described herein involve the wireless terminal 114 learning registration information and/or payment information dynamically during operation. For example, in the scenario described above in which the AP 104a advertises registration parameters indicating that it requires a valid email address of a subscriber, and the wireless terminal 114 does not have a valid email address pre-stored therein, the wireless terminal 114 can be configured to prompt a user for an email address. The wireless terminal 114 can then learn the user's email address and store it in memory for future use. For example, the wireless terminal 114 can learn that the email address is to be used whenever the AP 104a requests an email address during a subsequent registration process. That is, the wireless terminal 114 can create and store an identifier of the AP 104a in connection with a local profile including pre-stored and dynamically learned information such as the user-provided email address for subsequently connecting with the AP 104a without needing to re-request the user for the email address. In addition, should the user elect not to provide an email address, the AP 104a can also learn and remember this type of response from the user so that during subsequent registration initiations with the AP 104a, the wireless terminal 114 can remember that the user elected not to provide an email address and that the user should not be subsequently bothered again with trying to connect to the AP 104a.

FIG. 3 depicts an example registration plan selection process implemented using the SSPN-A 108a external network and the wireless terminal 114 of FIG. 1. In the illustrated example, the SSPN-A 108a includes a plan schema data store 302 to store a registration parameters data structure 304 and any number of different registration plans (e.g., registration plans A-C 306a-c and/or any other registration plans not shown). The plan schema data store 302 includes different registration parameters 308a-e, each of which can be selected by the service provider A to indicate particular registration information required from a wireless terminal to register with the SSPN-A 108a. For example, to generate the registration plan A 306a, the service provider A can select a subset of the registration parameters 308a-e based on the registration requirements that the service provider A would like to require from the wireless terminals using the registration plan A 306a. In the illustrated example, the selectable registration parameters 304 include a registration plan type 308a, terms and conditions requirements 308b, sign up information 308c, payment information 308d, and provisioning information 308e. Further detail regarding possible states for each of the parameters is shown in FIG. 4, described below. The registration parameters 304 also include a registration result entry 310 to enable wireless APs to communicate to wireless terminals whether they have been successfully registered with the external network SSPN-A 108a.

The registration parameters 304 and each of the registration plans A-C 306a-c can be organized using an extensible markup language (XML) structure. In this manner, the AP 104a and the wireless terminal 114 can exchange registration requirements and registration information using the XML format. Alternatively, registration parameters 304 and each of the registration plans A-C 306a-c can be organized as sets of enumerated types, and the AP 104a and the wireless terminal 114 can exchange registration requirements and registration information using a type-length-value (TLV) structure format. For example, the AP 104a can encapsulate ones of the registration parameters 304 in EAP TLV type structures for communication to the wireless terminal 114 (e.g., via the registration response message 118), and the wireless terminal 114 can encapsulate registration information in EAP TLV type structures for communication to the AP 104a (e.g., via the registration information message 120).

Each of the registration plans A-C 306a-c can be used to require different registration information from wireless terminals to register with the SSPN-A 108a. Example registration parameters selectable to require different registration information from wireless terminals are shown in FIG. 4. Turning briefly to FIG. 4, the registration parameters data structure 304 is shown in detail. In the illustrated example, the registration plan type 308a can be selected to be a free plan type, a time-based plan type, a pay-as-you-go plan type, or an unlimited plan type. The terms and conditions requirements 308b include user-acknowledgement option to indicate whether a user is required to accept terms and conditions before allowing registration of the user's wireless terminal. The sign up information 308c a full name (first, last, initials) parameter, a username/password parameter, an email parameter, a phone no(s). parameter, a residence address parameter, a credit card information parameter, a payment token number parameter, a hotel room parameter, an access code parameter, and an access limit parameter.

The payment information 308d includes a payment requirement option parameter to indicate whether a user is required to provide payment or a promise of payment prior to allowing registration of the user's wireless terminal. Payment information can be exchanged securely within an EAP tunnel. For example, the Secure Electronic Transactions (SET) protocols or InternetOpen Trading Protocol (IOTP) (e.g., as defined in RFC 3538) could be used to process a credit card transaction to pay for hotspot access. Such messages could be encapsulated inside of an EAP transport payload using payment request/response TLV-formatted messages (or XML-formatted messages).

The provisioning information 308e includes a provisioning requirement option parameter to indicate whether a wireless terminal must be provisioned with an external network (e.g., the SSPN-A 108a) to allow registering the wireless terminal with the external network. Provisioning a wireless terminal involves establishing or setting up a permanent connection for the wireless terminal with an external network. For example, in the illustrated example of FIG. 1, when a connection is provisioned in the SSPN-A 108a for the wireless terminal 114 during an initial registration process in which the wireless terminal 114 is registered with the SSPN-A 108a, the wireless terminal 114 will always have that provisioned connection available to it whenever it is in proximity of the AP 104a. In this manner, the wireless terminal 114 need not re-register (e.g., need not re-provide the registration information 120 of FIG. 1) with the SSPN-A 108a during subsequent visits to the WLAN access location 102a. Instead, whenever the wireless terminal 114 returns within proximity of the AP 104a and requests to connect to the SSPN-A 108a, the SSPN-A 108a will allow the wireless terminal 114 to reconnect via the previously provisioned connection based on unique identification information (e.g., an electronic serial no., an international mobile equipment identity (IMEI) number, a telephone number, a username/password, etc.) provided by the wireless terminal 114. In the illustrated example of FIG. 3, the SSPN-A 108a is provided with a provisioning data store 311 to store provisioning information for provisioned wireless terminals. Provisioning of captive portal credentials can be done using provisioning request/response TLV-formatted messages inside a tunneled EAP method. Credential provisioning can be performed by sending key-wrapped credentials from the external network to the wireless terminal 114, allowing the wireless terminal 114 to register with a certificate authority to obtain a valid client certificate, or provisioning a proxy auto-config (PAC) file.

Returning to the illustrated example of FIG. 3, the example registration plan A 306a may be configured by the SSPN-A 108a to: (a) provide unlimited data access (e.g., an unlimited plan of the registration plan type 308a shown in FIG. 4); (b) not require a wireless terminal to provide a user-acceptance of terms and conditions (e.g., the terms and conditions requirements 308b); (c) require that the wireless terminal provide a first name, a last name, an email address, and an email address confirmation (e.g., the sign up information 308c); (d) not require payment (e.g., the payment information 308d); and (e) require provisioning (e.g., the provisioning information 308e).

The example registration plan B 306b may be configured by the SSPN-A 108a to: (a) provide a time-based data access (e.g., a time-based plan of the registration plan type 308a shown in FIG. 4); (b) not require a wireless terminal to provide a user-acceptance of terms and conditions (e.g., the terms and conditions requirements 308b); (c) require that the wireless terminal provide a first name, a last name, an email address, an email address confirmation, and credit card information (e.g., the sign up information 308c); (d) impose an access time limit of six hours (e.g., the sign up information 308c); (e) require payment (e.g., the payment information 308d); and (f) not require provisioning (e.g., the provisioning information 308e).

The example registration plan C 306c may be configured by the SSPN-A 108a to: (a) provide a time-based data access (e.g., a time-based plan of the registration plan type 308a shown in FIG. 4); (b) not require a wireless terminal to provide a user-acceptance of terms and conditions (e.g., the terms and conditions requirements 308b); (c) require that the wireless terminal provide a first name, a last name, an email address, an email address confirmation, and credit card information (e.g., the sign up information 308c); (d) impose an access time limit of twenty-four hours (e.g., the sign up information 308c); (e) require payment (e.g., the payment information 308d); and (f) not require provisioning (e.g., the provisioning information 308e).

The SSPN-A 108a may further configure other registration plans to allow or restrict registering wireless terminals associated with subscription or roaming agreements or wireless terminals for which no pre-established agreements exist between users of the wireless terminals and the service provider A of the SSPN-A 108a. In some example implementations, different registration plans may be configured for different wireless access locations (e.g., the WLAN access location 102a of FIG. 1). As shown in FIG. 3, the AP 104a stores registration plan A 306a and registration plan C 306c in a local plan schema data store 312 and may subsequently communicate the registration plans 306a and 306c one or more times to the wireless terminal 114 (or any other one or more wireless terminals). In this manner, when the wireless terminal 114 subsequently requests to register with the SSPN-A 108a (e.g., by communicating the registration request message 116 of FIG. 1), the AP 104a can communicate the registration response message 118 along with the selectable plan A 306a and the selectable plan C 306c. The wireless terminal 114 can then respond with the registration information message 120 including a selected plan 314 and registration information 316 corresponding to the required registration parameters of the selected plan 314.

In some example implementations, payment requirements and information corresponding to the payment information 308d can be communicated as part of the registration response message 118 and registration information message 120 or as a separate payment messaging exchange 318. Also, in some example implementations, provisioning requirements and information corresponding to the provisioning information 308e can be communicated as part of the registration response message 118 and registration information message 120 or as a separate provisioning messaging exchange 320.

Figure 5:
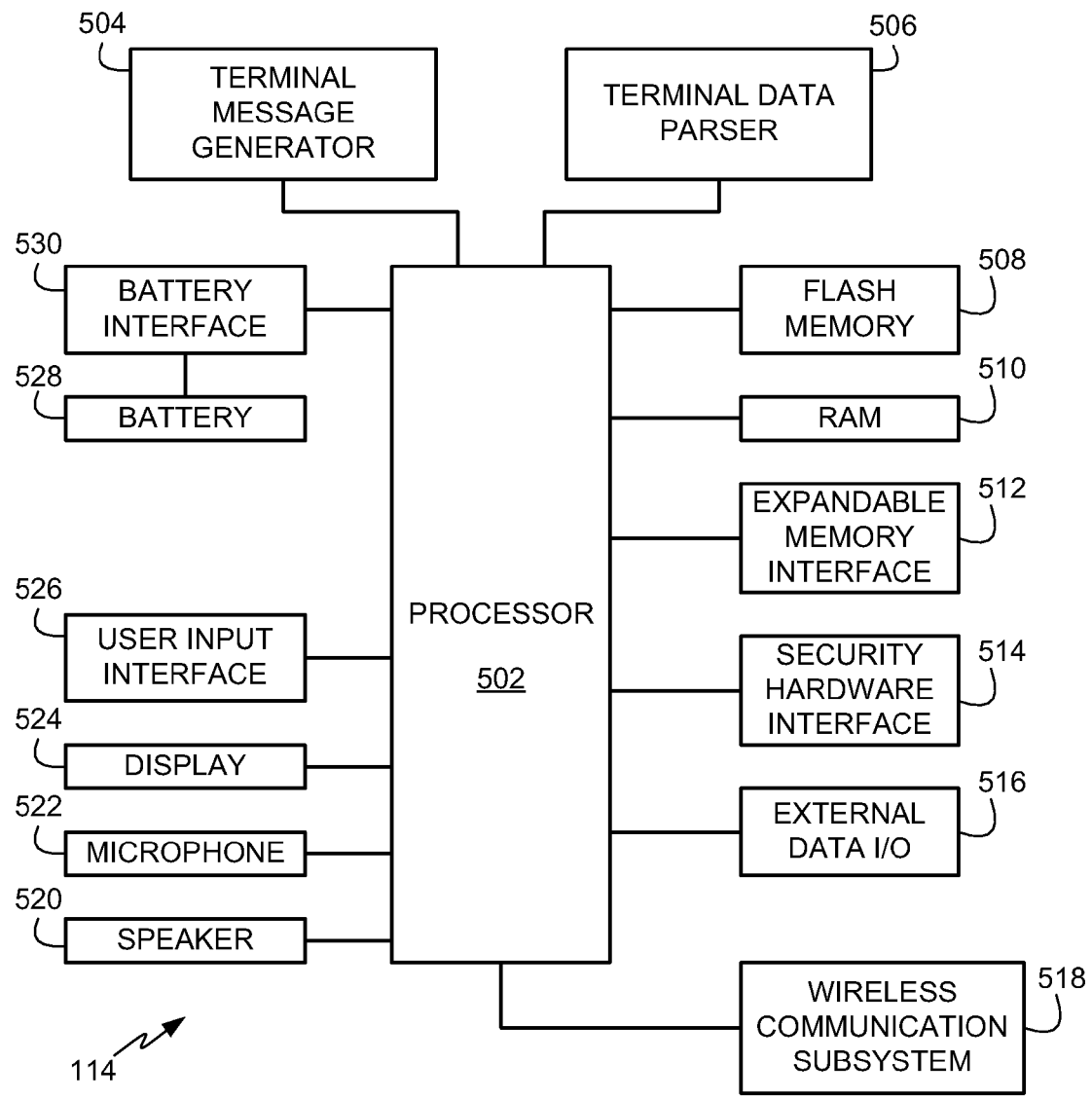
FIG. 5 depicts an example wireless terminal that may be used to implement the example methods and apparatus described herein.

Referring now to FIG. 5, an illustrated example of the wireless terminal 114 of FIGS. 1 and 3 is shown in block diagram form. In the illustrated example, the wireless terminal 114 includes a processor 502 that may be used to control the overall operation of the wireless terminal 114. The processor 502 may be implemented using a controller, a general purpose processor, a digital signal processor, dedicated hardware, or any combination thereof.

The wireless terminal 114 also includes a terminal message generator 504 and a terminal data parser 506. The terminal message generator 504 may be used to generate registration-related messages (e.g., TLV-formatted messages or XML-formatted messages) such as the registration request message 116 and the registration information message 120 of FIGS. 1 and 3 and/or payment and provisioning messages associated with the payment messaging exchange 318 and the provisioning messaging exchange 320 of FIG. 3. The terminal data parser 506 may be used to retrieve information from memory (e.g., a RAM 510). For example, the terminal data parser 506 can retrieve ones of the registration parameters 304 (FIG. 3) for received registration plans (e.g., received ones of the registration plans A-C 306a-c of FIG. 3) from TLV-formatted messages or XML-formatted messages.

Although the terminal message generator 504 and the terminal data parser 506 are shown as separate from and connected to the processor 502 in FIG. 5, in some example implementations, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any desired combination of hardware, firmware, and/or software. For example, one or more integrated circuits, discrete semiconductor components, and/or passive electronic components may be used. Thus, for example, the terminal message generator 504 and the terminal data parser 506, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 504 and the terminal data parser 506, or parts thereof, may be implemented using instructions, code, and/or other software and/or firmware, etc. stored on a machine accessible medium and executable by, for example, a processor (e.g., the example processor 502). When any of the appended claims are read to cover a purely software implementation, at least one of the terminal message generator 504 and the terminal data parser 506 is hereby expressly defined to include a tangible medium such as a solid state memory, a magnetic memory, a DVD, a CD, etc.

The example wireless terminal 114 shown in FIG. 5 also includes a FLASH memory 508, a random access memory (RAM) 510, and an expandable memory interface 512 communicatively coupled to the processor 502. The FLASH memory 508 can be used to, for example, store computer readable instructions and/or data. In some example implementations, the FLASH memory 508 can be used to store one or more of the data structures discussed above in connection with FIGS. 3 and 4 and can also pre-store registration information (e.g., user name, address, credit card information, and/or any other information indicated by the registration parameters 304 of FIGS. 3 and 4) associated with the wireless terminal 114. The RAM 510 can also be used to, for example, store data and/or instructions.

The wireless terminal 114 is provided with a security hardware interface 514 to receive a SIM card (or a USIM card or a NFC secure element) from a wireless service provider. A SIM card may be used as an authentication parameter to authenticate the wireless terminal 114 for establishing a connection with a WLAN-supported network. In some example implementations, a SIM card may also store registration information required to register with external networks. The wireless terminal 114 is also provided with an external data I/O interface 516. The external data I/O interface 516 may be used by a user to transfer information to the wireless terminal 114 through a wired medium.

The wireless terminal 114 is provided with a wireless communication subsystem 518 to enable wireless communications with WLAN APs (e.g., the APs 104a-c of FIG. 1). Although not shown, the wireless terminal 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 can be implemented using a BLUETOOTH® radio, a ZIGBEE® device, a wireless USB device, or an ultra-wideband (UWB) radio.

To enable a user to use and interact with or via the wireless terminal 114, the wireless terminal 114 is provided with a speaker 520, a microphone 522, a display 524, and a user input interface 526. The display 524 can be an LCD display, an e-paper display, etc. The user input interface 526 could be an alphanumeric keyboard and/or telephone-type keypad, a multi-direction actuator or roller wheel with dynamic button pressing capability, a touch panel, etc. As discussed above, the example methods and apparatus described herein can also be advantageously used in connection with wireless terminals that do not have user interfaces and, thus, the speaker, 520, the microphone 522, the display 524, the user input interface 526, and/or any combination thereof may be optionally omitted. In the illustrated example, the wireless terminal 114 is a battery-powered device and is, thus, provided with a battery 528 and a battery interface 530.

Figure 6:
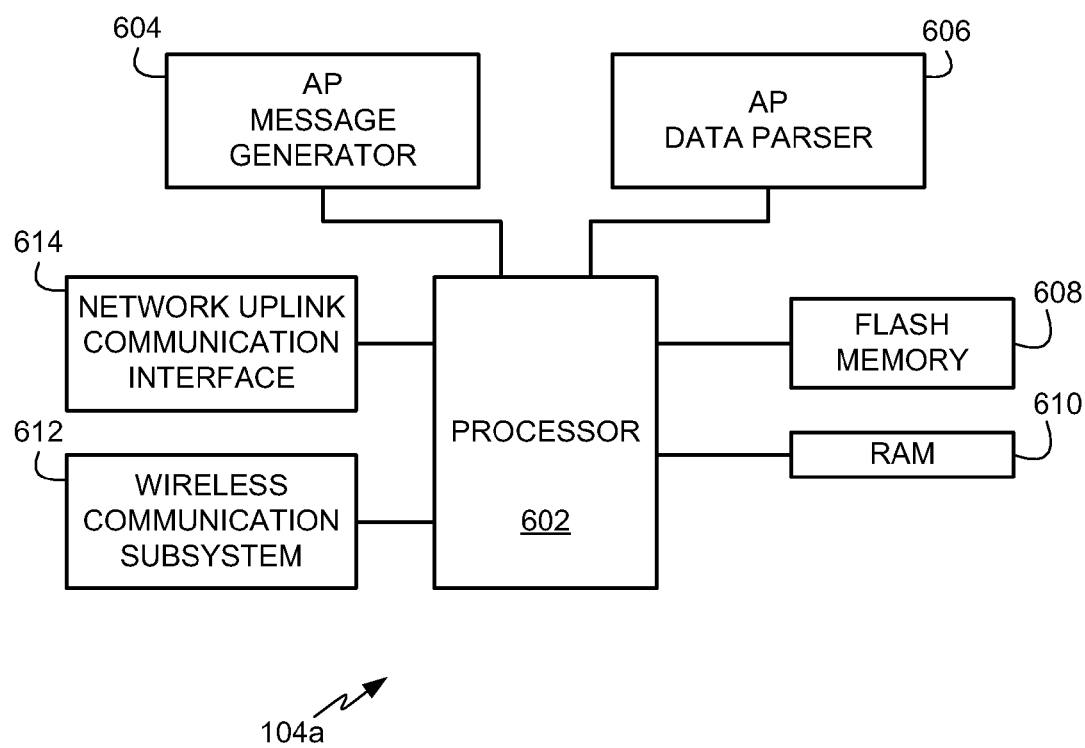
FIG. 6 depicts an example wireless access point that may be used to implement the example methods and apparatus described herein.

Turning now to FIG. 6, the example AP 104a of FIGS. 1 and 3 is shown in block diagram form. The example AP 104a includes a processor 602 to perform the overall operations of the AP 104a. In addition, the AP 104a includes an AP message generator 604 to generate TLV or XML-formatted messages (e.g., the registration response message 118 and the registration status message 122 of FIGS. 1 and 3 and/or payment and provisioning messages associated with the payment messaging exchange 318 and the provisioning messaging exchange 320 of FIG. 3). The AP 104a also includes an AP data parser 606 to retrieve information from received messages sent by the wireless terminal 114. The AP message generator 604 is substantially similar to the terminal message generator 504 of FIG. 5, and the AP data parser 606 is substantially similar to the terminal data parser 506 of FIG. 5. Thus, the AP message generator 604 and the AP data parser 606 may be implemented in the processor 602 and/or a wireless communication subsystem (e.g., a wireless communication subsystem 612) using any combination of hardware, firmware, and/or software including instructions stored on a computer-readable medium.

The example AP 104a also includes a FLASH memory 608 and a RAM 610, both of which are coupled to the processor

602. The FLASH memory 608 may be configured to store registration plans (e.g., the registration plans A and C 306a and 306c as shown stored in the local plan schema data store 312 in FIG. 3). The RAM 610 may be used to generate messages for communication to the wireless terminal 114 and/or to store received messages communicated by the wireless terminal 114.

To communicate with wireless terminals such as the wireless terminal 114, the AP 104a is provided with a wireless communication subsystem 612, which may be substantially similar or identical to the wireless communication subsystem 518 (FIG. 5) of the wireless terminal 114. To communicate with a WLAN-supported network or external network (e.g., the networks 106a-b, 110, and 108a-b), the AP 104a is provided with a network uplink communication interface 614. In the illustrated example, the network uplink communication interface 614 enables the AP 104a to communicate with external networks (e.g., the private network 106a and/or the SSPN-A 108a.

Figure 7A:
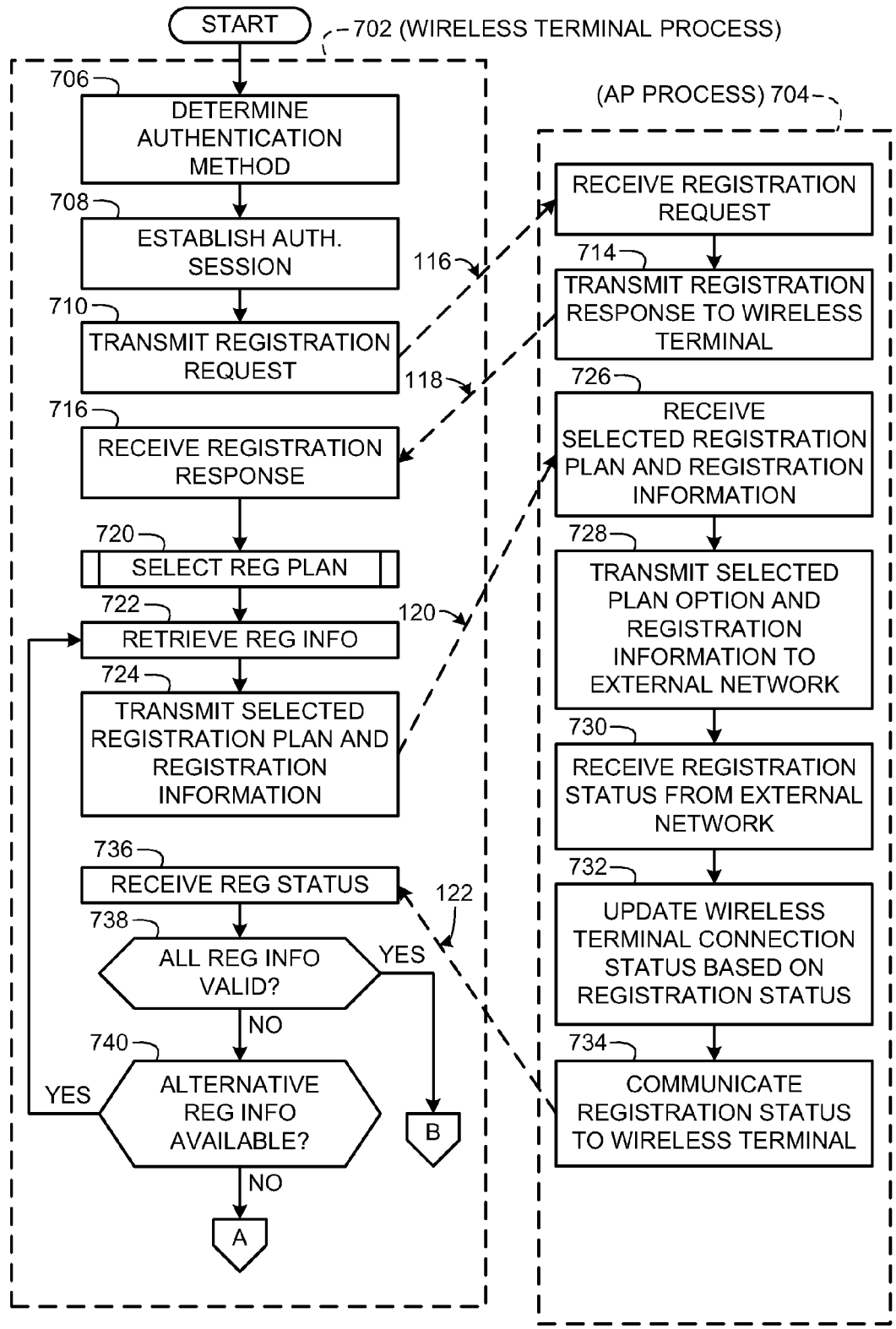
FIGS. 7A and 7B depict flow diagrams representative of example processes that may be used to register a wireless terminal to an external network via a wireless network.
Figure 7B:
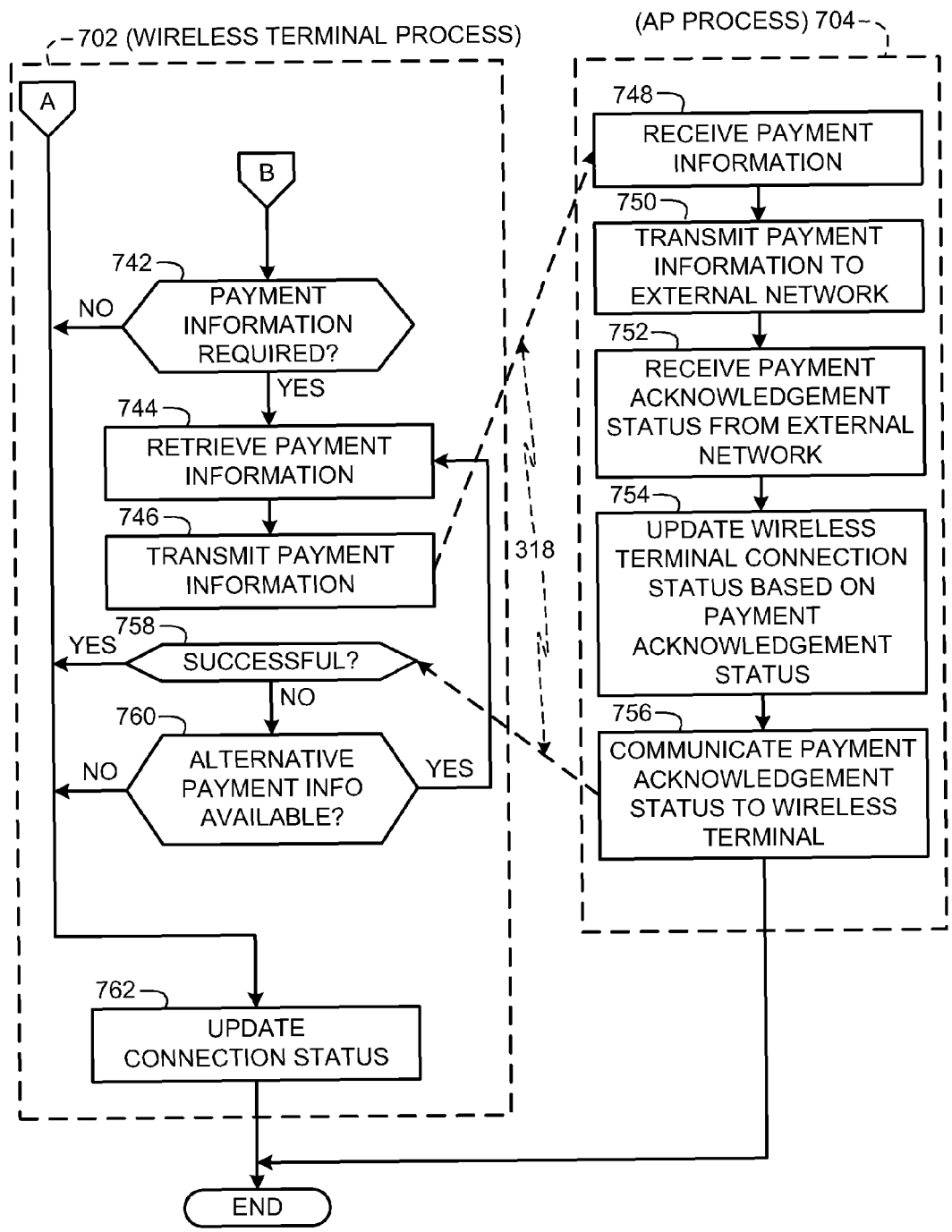
Figure 8:
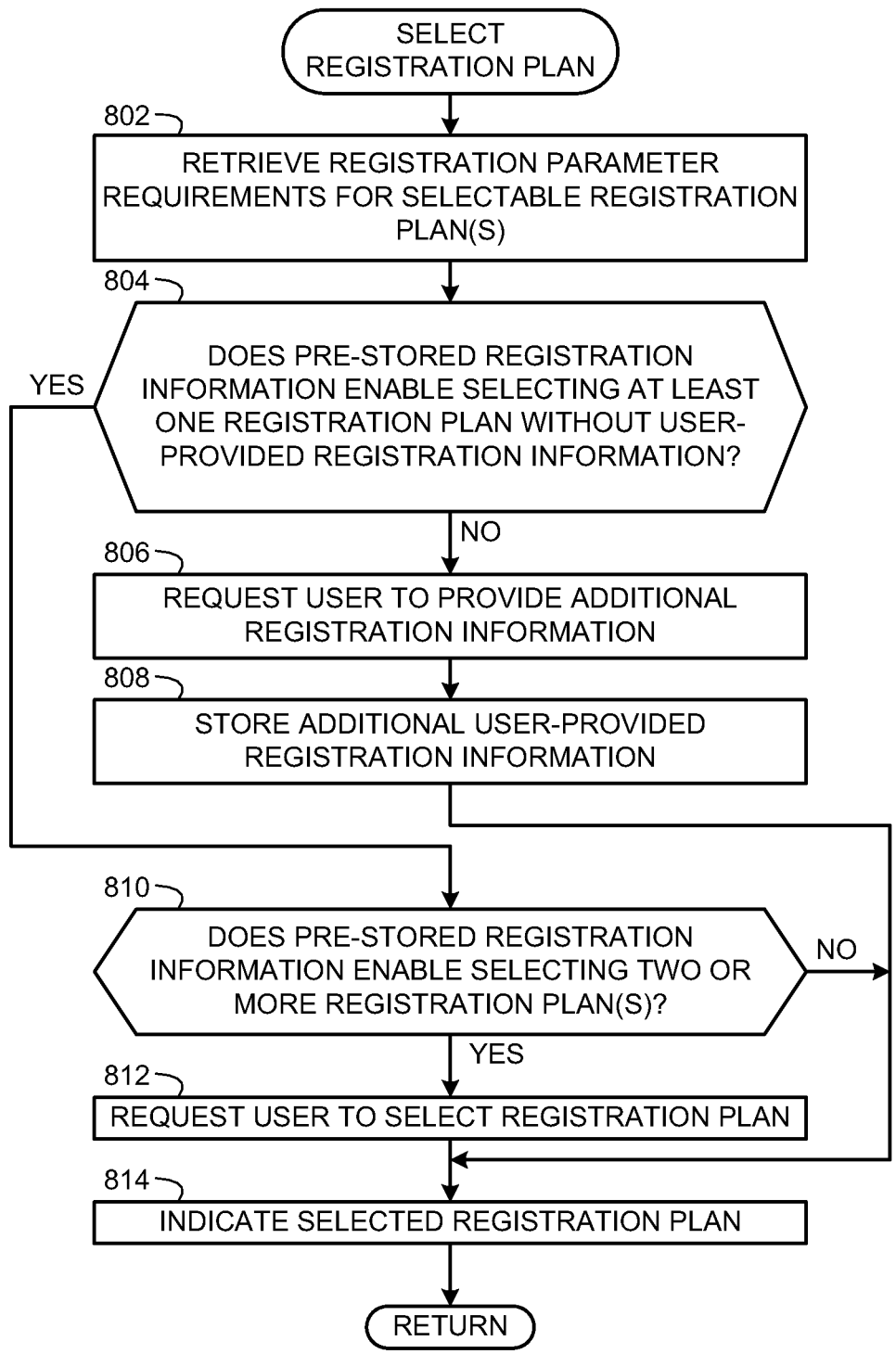
FIG. 8 depicts a flow diagram representative of an example process that may be used to select a registration plan for registering a wireless terminal to an external network via a wireless network.

FIGS. 7A, 7B, and 8 depict example flow diagrams representative of processes that may be implemented using computer readable instructions that may be used to register a wireless terminal (e.g., the wireless terminal 114 of FIGS. 1, 3, and 5) with a WLAN-supported network or an external network (e.g., the networks 106a-b, 108a-b, and 110 of FIG. 1). The example operations of FIGS. 7A, 7B, and 8 may be performed using a processor, a controller and/or any other suitable processing device. For example, the example operations of FIGS. 7A, 7B, and 8 may be implemented using coded instructions stored on a tangible medium such as a flash memory, a read-only memory (ROM) and/or random-access memory (RAM) associated with a processor (e.g., the processor 502 of FIG. 5 and/or the processor 602 of FIG. 6). Alternatively, some or all of the example operations of FIGS. 7A, 7B, and 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIGS. 7A, 7B, and 8 may be implemented manually or as any combination(s) of any of the foregoing techniques, for example, any combination of firmware, software, discrete logic and/or hardware. Further, although the example operations of FIGS. 7A, 7B, and 8 are described with reference to the flow diagrams of FIGS. 7A, 7B, and 8, other methods of implementing the operations of FIGS. 7A, 7B, and 8 may be employed. For example, the order of execution of the blocks may be changed, and/or some of the blocks described may be changed, eliminated, sub-divided, or combined. Additionally, any or all of the example operations of FIGS. 7A, 7B, and 8 may be performed sequentially and/or in parallel by, for example, separate processing threads, processors, devices, discrete logic, circuits, etc.

The example flow diagrams of FIGS. 7A and 7B include a wireless terminal process 702 and an AP process 704 that cooperatively interact to facilitate communication between the wireless terminal 114 and the AP 104a. In the illustrated example, the wireless terminal process 702 is implemented using the wireless terminal 114 (FIGS. 1, 3, and 5) to communicate registration information to the AP 104a to register with the private network 106a and/or the SSPN-A 108a of FIGS. 1 and 3. The AP process 704 can be implemented using the AP 104a (FIGS. 1, 3 and 6) to transmit registration parameters to the wireless terminal 114 indicative of required registration information and to receive such registration information from the wireless terminal 114.

Turning in detail to FIGS. 7A and 7B, initially, the wireless terminal 114 determines an authentication method (block 706) (FIG. 7A) to be used to communicate registration information with the AP 104a. In the illustrated example, the authentication method is a tunneled EAP method with EAP-WISP as an inner authentication method. The wireless terminal 114 can discover the authentication method as described in U.S. provisional application Ser. No. 12/504,500, filed Jul. 16, 2009, titled "Methods and Apparatus to Discover Authentication Information in a Wireless Networking Environment," which is incorporated herein by reference in its entirety.

The wireless terminal 114 establishes an authentication session with the AP 104a (block 708) based on the authentication method identified at block 706. The wireless terminal 114 transmits the registration request message 116 (FIG. 1) to the AP 104a (block 710). The AP 104a receives the registration request message 116 (block 712) and transmits the registration response message 118 (FIGS. 1 and 3) (block 714) to the wireless terminal 114. As discussed above, the registration response message 118 includes an indication of one or more registration plans (e.g., the registration plans A-C 306a-c of FIG. 3) that may be selected by the wireless terminal 114 to facilitate authorized connection. For example, the one or more different registration plans may be retrieved from the local plan schema data store 312 (FIG. 3).

The wireless terminal 114 receives the registration response message 118 (block 716), and the wireless terminal 114 selects a registration plan (block 720) provided in the registration response message 118. An example process that the wireless terminal 114 can use to select a registration plan is described below in connection with the flow diagram of FIG. 8.

After a registration plan is selected at block 720, the wireless terminal 114 retrieves registration information required by the selected registration plan (block 722). For example, if the wireless terminal 114 has pre-stored all of the required registration information, the wireless terminal 114 can retrieve the registration information from its memory (e.g., the flash memory 508, the RAM 510, or a SIM card). Additionally or alternatively, if some or all of the registration information must be provided by a user, the wireless terminal 114 can prompt a user (e.g., via a graphical user interface prompt) to provide the required registration information (e.g., name and address). In the illustrated example, the terminal message generator 504 can be used to format the registration information in a TLV-formatted message or an XML-formatted message to generate the registration information message 120 (FIGS. 1 and 3). The wireless terminal 114 transmits the selected registration plan and registration information to the AP 104a (block 724) via, for example, the registration information message 120.

The AP 104a receives the selected registration plan and the registration information (block 726) and transmits the same to the external network (e.g., the private network 106a and/or the SSPN-A 108a) (block 728). In this manner, a server of the external network can analyze the provided registration information to determine whether it is valid for allowing registration of the wireless terminal 114. The external network can also determine whether the wireless terminal 114 can be provisioned (or has been provisioned) if provisioning is required and determine whether payment information is necessary (e.g., based on the selected plan).

The AP 104a then receives a registration status from the external network (block 730). For example, the registration status can indicate whether all of the registration information was valid to result in a successful registration (and provisioning, if necessary) and can also indicate whether payment is required. If not all registration was valid, the registration status can indicate which registration information is invalid. In some example implementations, such as those in which registration is effective for a limited duration, an authentication, authorization, and accounting (AAA) server of the external network that supports a Remote Authentication Dial In User Service (RADIUS) (RFC 2865) or Diamater (RFC 3588) can optionally send a session-timeout attribute in the registration status to the AP 104*a* to inform the AP 104*a* of the time to session expiry in seconds.

The AP 104*a* then updates its connection status for the wireless terminal 114 based on the registration status received from the external network (block 732). The AP 104*a* communicates the registration status to the wireless terminal 114 (block 734) via, for example, the registration status message 122 of FIG. 1. For time-limited access registrations, the registration status message 122 can include an additional TLV-formatted frame including the time to session expiry in seconds as provided by the external network to the AP 104*a*.

The wireless terminal 114 receives the registration status message 122 (block 736) and determines whether all of the registration information was valid (block 738). In the illustrated example of FIG. 7B, when the wireless terminal 114 receives the registration status message 122, the wireless terminal 114 is in a registration state. However, in other example implementations, the wireless terminal 114 may be in a discovery state, a provisioning state, and/or an access state. If all registration information was not valid (block 738), the wireless terminal 114 determines whether any alternative registration information is available (block 740). For example, the wireless terminal 114 can review which entries of the registration information is indicated as invalid in the registration status message 122 and determine if alternative registration information is available as pre-stored in memory or whether a user can provide the alternative registration information for any information indicated as invalid by the external network. If alternative registration information is available (block 740), control returns to block 722 to retrieve and communicate the alternative registration information.

If at block 738, the wireless terminal 114 determines that all of the registration information was valid (block 738), control passes to block 742 of FIG. 7B, and the wireless terminal 114 determines whether payment information is required (block 742). For example, depending on the plan selected at block 720, a payment may be required to enable successful registration. If payment is required (block 742), the wireless terminal 744 retrieves payment information (block 744). For example, if the wireless terminal 114 has pre-stored payment information (e.g., credit card information, online payment account #, etc.), the wireless terminal 114 can retrieve the payment information from its memory (e.g., the flash memory 508 or the RAM 510). Additionally or alternatively, if some or all of the payment information must be provided by a user, the wireless terminal 114 can prompt a user (e.g., via a graphical user interface prompt) to provide the required payment information (e.g., credit card information). In the illustrated example, the terminal message generator 504 can be used to format the payment information in a TLV-formatted message or an XML-formatted message to generate the payment information message. The wireless terminal 114 transmits the payment information to the AP 104*a* (block 746) via, for example, the payment messaging 318 of FIG. 3.

The AP 104*a* receives the payment information (block 748) and transmits the same to the external network (e.g., the private network 106*a* and/or the SSPN-A 108*a*) (block 750). In this manner a server of the external network can analyze the provided payment information to determine its validity.

The AP 104*a* then receives a payment acknowledgement status from the external network (block 752). The payment acknowledgement status can indicate whether the provided payment information is valid or whether any of it is invalid. The AP 104*a* then updates its wireless terminal connection status based on the payment acknowledgement status (block 754). For example, if the payment information was valid, the AP 104*a* can update its wireless terminal connection status to indicate that a connection was successful. The AP 104*a* communicates the payment acknowledgement status to the wireless terminal 114 (block 756).

The wireless terminal 114 determines whether the payment acknowledgement status indicates a successful verification of the provided payment information (block 758). If all of the payment information was not successfully verified as valid (block 758), the wireless terminal 114 determines whether any alternative payment information is available (block 760). For example, the wireless terminal 114 can determine if alternative payment information is available as pre-stored in memory or whether a user can provide the alternative payment information. If alternative payment information is available (block 760), control returns to block 744 to retrieve and communicate the alternative payment information.

If alternative payment information is not available (block 760) or if the payment information was successfully verified as valid (block 758) or if payment information is not required (block 742) or if alternative registration information is not available (block 740), the wireless terminal 114 updates its connection status (block 762) to indicate whether registration was successful and, thus, whether the wireless terminal 114 is connected to the external network. The example processes of FIGS. 7A and 7B is then ended.

Turning now to FIG. 8, the depicted example process can be used by the wireless terminal 114 to implement the operation of block 720 of FIG. 7 to select a registration plan (e.g., one of the registration plans 306*a-c* of FIG. 3). Initially, the terminal data parser 506 (FIG. 5) retrieves the registration parameter requirements for each of the selectable registration plans (block 802) received from the AP 104*a* via the registration response message 118 (FIGS. 1 and 3). The wireless terminal 114 determines whether the pre-stored registration information enables selecting at least one registration plan without any user-provided registration information (block 804). If the pre-stored registration information does not enable selecting at least one registration plan (block 804), the wireless terminal 114 requests a user to provide additional registration information (block 806). For example, the additional registration information may be credit card information that a user wishes not to pre-store in the wireless terminal 114. After receiving the additional user-provided registration information, the wireless terminal 114 stores the additional user-provided registration information (block 808) in memory (e.g., the flash memory 508 or the RAM 510 of FIG. 5).

If the wireless terminal 114 determines at block 804 that it has pre-stored registration information to enable selecting at least one registration plan without any user-provided registration information (block 804), control passes to block 810. At block 810, the wireless terminal 114 determines whether the pre-stored registration information enables selecting two or more registration plans (block 810). If the pre-stored registration information enables selecting two or more registration plans (block 810), the wireless terminal 114 requests a user to select a registration plan (block 812). In some example implementations, a plan priority could be pre-stored in the wireless terminal 114 to enable the wireless terminal 114 to automatically select a registration plan having a highest priority. In such implementations, a user would not need to be prompted to select a registration plan. Instead, the wireless terminal 114 would automatically select a registration plan based on priority.

After a user selects a registration plan (block 812) or if the pre-stored registration information does not enable selecting two or more registration plans (block 810) or after the wireless terminal stores the additional user-provided registration information (block 808) to enable selection of a registration plan, the wireless terminal 114 indicates the selected registration plan (block 814). In this manner, the terminal message generator 504 (FIG. 5) can generate the registration information message 120 (FIGS. 1 and 3) for transmission to the AP 104*a*. The example process of FIG. 8 is then ended and control returns to a calling process or function such as the calling process of FIG. 7

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to enhance connectivity for a user device in a wireless local area network, the method comprising:
    receiving a registration response at the user device, the registration response indicating one or more registration plans;
    selecting, at the user device, a registration plan from the one or more registration plans;
    sending registration information stored in the user device to a network entity via a data link layer, the registration information selected based on the selected registration plan; and
    entering a provisioning state after sending the registration information.

2. A method as defined in claim 1 further comprising, prior to receiving the registration response at the user device, sending a registration request from the user device to the network entity.

3. A method as defined in claim 1, wherein the registration information includes at least one of a terms and conditions acceptance, a username, or a user identity.

4. A method as defined in claim 1, wherein each of the one or more registration plans is associated with one of a time-based plan, a pay-as-you-go plan, or a free access plan.

5. A method as defined in claim 1, wherein the network entity provides access to a local area network.

6. A method as defined in claim 5, wherein the one or more registration plans are associated with registering the user device with an external network in communication with the local area network.

7. A method as defined in claim 1 further comprising, during the provisioning state:
    sending a provisioning request from the user device to the network entity; and
    receiving, in response to the provisioning request, a provisioning status indicative of whether the user device is successfully provisioned.

8. A method as defined in claim 1, wherein the sending of the registration information stored in the user device to the network entity comprises sending the registration information using an extensible authentication protocol (EAP) method.

9. An apparatus to enhance connectivity for a user device in a wireless local area network, the apparatus comprising:
    a processor configured to:
        receive a registration response at the user device, the registration response indicating one or more registration plans;
        select a registration plan, at the user device, from the one or more registration plans;
        send registration information stored in the user device to a network entity via a data link layer, the registration information selected based on the selected registration plan; and
        enter a provisioning state after sending the registration information.

10. An apparatus as defined in claim 9, wherein the network entity is an access point.

11. An apparatus as defined in claim 9, wherein the processor is configured to, prior to receiving the registration response at the user device, send a registration request from the user device to the network entity.

12. An apparatus as defined in claim 11, wherein the registration response is communicated by the network entity in response to the registration request from the user device.

13. An apparatus as defined in claim 9, wherein the processor is configured to send an identifier of the selected registration plan to the network entity in association with the registration information.

14. An apparatus as defined in claim 9, wherein the network entity provides access to a local area network.

15. An apparatus as defined in claim 14, wherein the one or more registration plans are associated with registering the user device with an external network in communication with the local area network.

16. An apparatus as defined in claim 15, wherein the external network is a service provider network that operates based on subscription-based services available to the user device based on the one or more registration plans.

17. An apparatus as defined in claim 14, wherein the local area network is a wireless local area network.

18. An apparatus as defined in claim 9, wherein the one or more registration plans are in an extensible markup language (XML) format.

19. An apparatus as defined in claim 9, wherein the processor is configured to, during the provisioning state:
    send a provisioning request to the network entity; and
    receive, in response to the provisioning request, a provisioning status indicative of whether the user device is successfully provisioned.

20. An apparatus as defined in claim 9, wherein the processor is configured to send the registration information stored in the user device to the network entity by sending the registration information using an extensible authentication protocol (EAP) method.

* * * * *